(12) United States Patent
Feng et al.

(10) Patent No.: US 11,852,615 B2
(45) Date of Patent: Dec. 26, 2023

(54) ONE-WAY RAPID ELECTROMAGNETIC UNLOADING DEVICE SUITABLE FOR TRUE TRIAXIAL TESTING MACHINE

(71) Applicant: Northeastern University, Shenyang (CN)

(72) Inventors: Xiating Feng, Shenyang (CN); Xiaojun Yu, Shenyang (CN); Jun Tian, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 135 days.

(21) Appl. No.: 17/920,553

(22) PCT Filed: Sep. 18, 2019

(86) PCT No.: PCT/CN2019/106345
§ 371 (c)(1),
(2) Date: Oct. 21, 2022

(87) PCT Pub. No.: WO2021/051295
PCT Pub. Date: Mar. 25, 2021

(65) Prior Publication Data
US 2023/0332991 A1    Oct. 19, 2023

(30) Foreign Application Priority Data
Sep. 17, 2019 (CN) .......................... 201910874708.2

(51) Int. Cl.
*G01N 3/12* (2006.01)
*G01N 3/06* (2006.01)

(52) U.S. Cl.
CPC .............. *G01N 3/12* (2013.01); *G01N 3/066* (2013.01); *G01N 2203/0256* (2013.01)

(58) Field of Classification Search
CPC ... G01N 3/12; G01N 3/066; G01N 2203/0256
(Continued)

(56) References Cited

U.S. PATENT DOCUMENTS

| 2017/0356831 A1* | 12/2017 | Fu | .............................. G01N 3/20 |
| 2018/0058993 A1* | 3/2018 | Terentiev | ............... F16J 15/064 |
| 2018/0100387 A1* | 4/2018 | Kouchmeshky | ........ G01N 29/34 |

FOREIGN PATENT DOCUMENTS

| CN | 105865930 A | 8/2016 |
| CN | 106840901 A * | 6/2017 | ............... G01N 3/12 |

(Continued)

*Primary Examiner* — Marrit Eyassu
(74) *Attorney, Agent, or Firm* — Muncy, Geissler, Olds & Lowe, P.C.

(57) ABSTRACT

The invention relates to a one-way rapid electromagnetic unloading device suitable for a true triaxial testing machine, comprising a first electromagnet, a second electromagnet, a first electromagnet mounting base, a second electromagnet mounting base and a restraining disc. A frame of the true triaxial testing machine is provided with a mounting hole for the unloading device. The first electromagnet mounting base is fixedly mounted in the mounting hole for the unloading device, and the first electromagnet is fixedly mounted on the first electromagnet mounting base. The restraining disc is fixedly mounted at an opening of the mounting hole for the unloading device, and the second electromagnet mounting base is located between the restraining disc and the first electromagnet. The second electromagnet is fixedly mounted on the second electromagnet mounting base and is opposite to the first electromagnet.

4 Claims, 3 Drawing Sheets

(58) Field of Classification Search
USPC .......................................................... 73/37.5
See application file for complete search history.

(56) References Cited

FOREIGN PATENT DOCUMENTS

| | | | |
|---|---|---|---|
| CN | 107764628 A | | 3/2018 |
| CN | 208223963 U | | 12/2018 |
| CN | 109883849 A | * | 6/2019 |
| CN | 110618030 A | | 12/2019 |
| KR | 20160057002 A | * | 5/2016 |

* cited by examiner

ONE-WAY RAPID ELECTROMAGNETIC UNLOADING DEVICE SUITABLE FOR TRUE TRIAXIAL TESTING MACHINE

BACKGROUND OF THE INVENTION

1. Field of the Invention

The invention belongs to the technical field of rock mechanics test, and particularly relates to a one-way rapid electromagnetic unloading device suitable for a true triaxial testing machine.

2. The Prior Arts

Geologic hazards such as rock burst and large deformation of deep surrounding rocks have become a worldwide technical problem in the field of rock engineering, and a true triaxial unloading test is widely used as an important means to simulate geologic hazards induced by excavation disturbance. In addition, a fracture mechanism and rheological effects of rock masses under the condition of one-way rapid unloading have also become one of the hot topics in the field of rock mechanics. The industry generally hopes that a true triaxial testing machine for rocks can be added with the function of rapid unloading.

At present, a domestic and foreign rock mechanics testing machine with rapid unloading function generally adopts oil pressure to provide unloading power. Although a way of providing unloading power by oil pressure can meet the requirements of rapid unloading speed to a certain extent, oil pressure unloading has the defects of being large in resource waste and easy to cause environment pollution. In addition, when the oil pressure is too large, it will not only have a large impact on an oil pipeline and are prone to dangerous accidents, but also a supporting hydraulic station has the disadvantage of high volume, thereby resulting in high space occupancy and increased costs.

SUMMARY OF THE INVENTION

In view of the problems existing in the prior art, the invention provides a one-way rapid electromagnetic unloading device suitable for a true triaxial testing machine, which discards a traditional way of using oil pressure to provide unloading power, and uses electromagnetic force to provide the unloading power. The device is integrated on a frame of the true triaxial testing machine as a whole, and has the characteristics of fast unloading response, controllable unloading rate, simple structure, space saving, and environmental protection, and can meet the requirements of various unloading tests.

In order to achieve the purpose, the invention adopts the following technical solution: the one-way rapid electromagnetic unloading device suitable for a true triaxial testing machine, comprising a first electromagnet, a second electromagnet, a first electromagnet mounting base, a second electromagnet mounting base and a restraining disc, wherein a frame of the true triaxial testing machine is provided with a mounting hole for the unloading device; the first electromagnet mounting base adopts a cylindrical structure, a cylinder wall is formed at a cylinder opening at one side of the first electromagnet mounting base, no cylinder wall is formed at another side of the first electromagnet mounting base, the first electromagnet mounting base is fixedly mounted in the mounting hole for the unloading device through bolts, and the cylinder opening disposed at the one side with the cylinder wall of the first electromagnet mounting base faces a center of the frame, and the cylinder opening disposed at the other side without the cylinder wall of the first electromagnet mounting base faces an outside of the frame; the first electromagnet adopts an annular structure, and fixedly mounted on the first electromagnet mounting base through bolts, and the first electromagnet and the first electromagnet mounting base are coaxially arranged; the restraining disc adopts an annular structure, and is located at an outer side of the cylinder opening at the other side without the cylinder wall of the first electromagnet mounting base, the restraining disc is fixedly mounted on the frame through bolts, and the restraining disc and the first electromagnet mounting base are coaxially arranged; the second electromagnet mounting base adopts an annular structure, and is located between the restraining disc and the first electromagnet, the second electromagnet mounting base has an axial movement degree of freedom between the restraining disc and the first electromagnet, and a maximum distance between the second electromagnet mounting base and the first electromagnet is set as an unloading clearance; the second electromagnet mounting base and the first electromagnet are coaxially arranged; the second electromagnet adopts an annular structure, the second electromagnet is fixedly mounted on the second electromagnet mounting base through bolts, the second electromagnet is directly opposite to the first electromagnet, and the second electromagnet and the second electromagnet mounting base are coaxially arranged; the second electromagnet mounting base fixedly sleeves a cylinder of an actuator of the true triaxial testing machine, a piston rod through hole is arranged at a center of the cylinder wall of the cylinder opening of the first electromagnet mounting base, and a piston rod of the actuator penetrates through the piston rod through hole to be fixedly connected with a load measuring piece of the true triaxial testing machine; and the first electromagnet mounting base and the second electromagnet mounting base are both made of a magnetic isolation material.

An antifriction material layer is further provided on an inner surface of a lateral cylinder wall of the first electromagnet mounting base, and the second electromagnet mounting base is in sliding contact with the antifriction material layer.

A coil of the first electromagnet and a coil of the second electromagnet are connected with a power supply through an unloading controller, and the magnitudes and directions of currents in the coil of the first electromagnet and in the coil of the second electromagnet are regulated through the unloading controller, thereby regulating the magnitudes and directions of electromagnetic forces of the first electromagnet and the second electromagnet; and A buffer layer is further provided on an inner surface of the restraining disc and adopts a spring pad or a rubber pad, and the buffer layer eliminates a kinetic energy of the second electromagnet, the second electromagnet mounting base and the actuator of the true triaxial testing machine during unloading, so as to reduce an impact force on the frame of the true triaxial testing machine.

Beneficial Effects of the Invention

The one-way rapid electromagnetic unloading device suitable for a true triaxial testing machine of the invention discards a traditional way of providing unloading power by oil pressure, and uses electromagnetic force to provide the unloading power. The device is integrated on a frame of the true triaxial testing machine as a whole, has the characteristics of fast unloading response, controllable unloading rate, simple structure, space saving, and environmental protection, and can meet the requirements of various unloading tests.

In drawings, 1: first electromagnet; 2: second electromagnet; 3: first electromagnet mounting base; 4: second electromagnet mounting base; 5: restraining disc; 6: frame; 7: mounting hole for an unloading device; 8: actuator; 9: piston rod through hole; 10: load measuring piece; 11: antifriction material layer; 12: unloading controller; and 13: power supply.

DETAILED DESCRIPTION OF THE PREFERRED EMBODIMENT

The invention is further described in detail below in combination with the drawings and specific embodiments.

Figure 1:
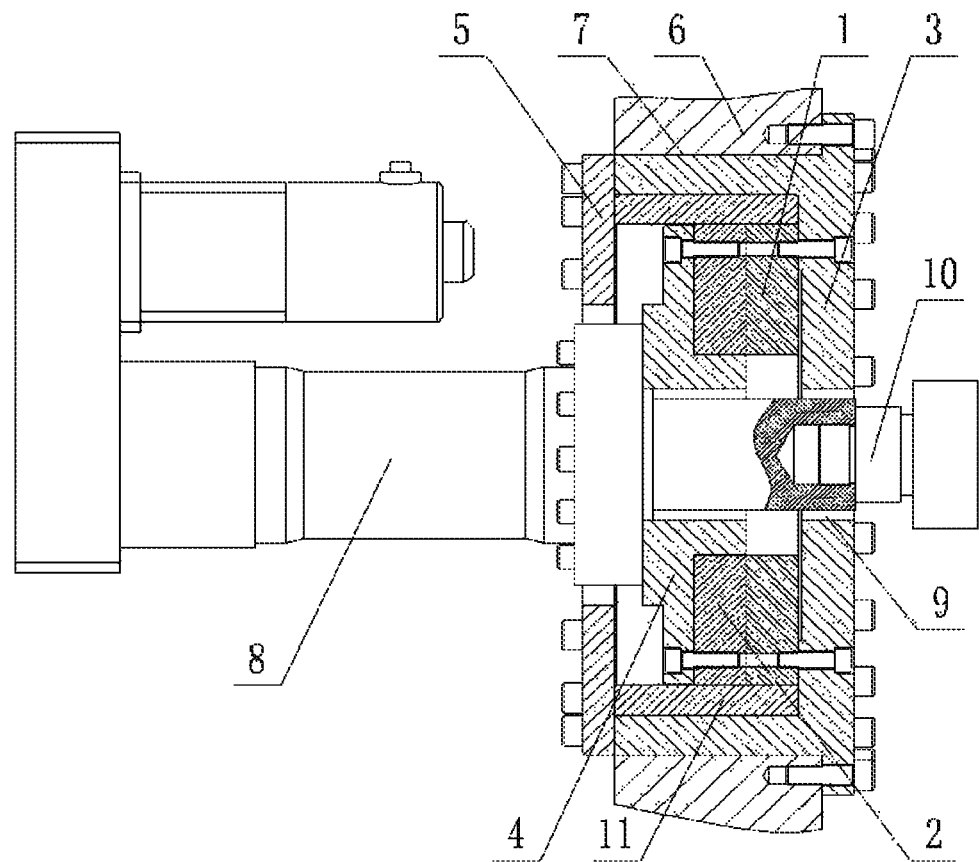
FIG. 1 is the structural diagram of a one-way rapid electromagnetic unloading device suitable for a true triaxial testing machine of the invention (a first electromagnet and a second electromagnet are engaged under electromagnetic attraction)
Figure 2:
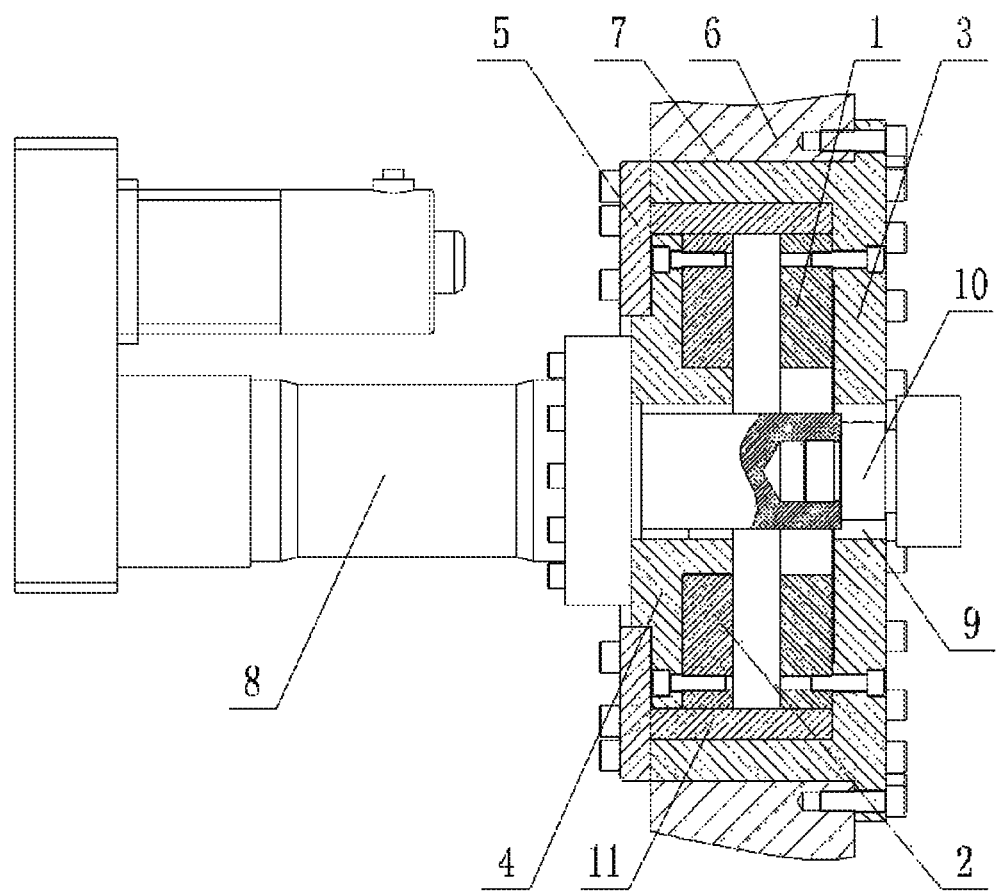
FIG. 2 is the structural diagram of a one-way rapid electromagnetic unloading device suitable for a true triaxial testing machine of the invention (the first electromagnet and the second electromagnet are separated under electromagnetic repulsion force)
Figure 3:
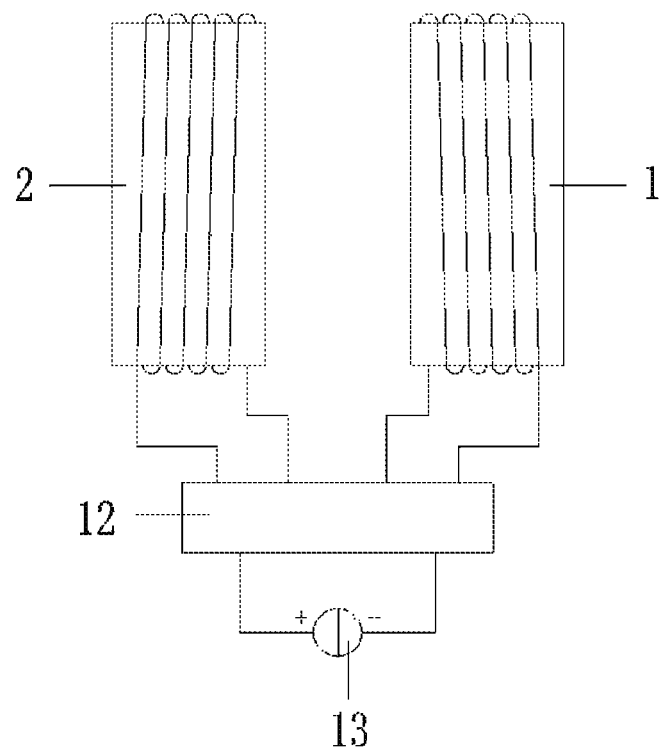
FIG. 3 is a control schematic diagram of the one-way rapid electromagnetic unloading device suitable for a true triaxial testing machine of the invention.

As shown in FIGS. 1 to 3, a one-way rapid electromagnetic unloading device suitable for a true triaxial testing machine comprises a first electromagnet 1, a second electromagnet 2, a first electromagnet mounting base 3, a second electromagnet mounting base 4 and a restraining disc 5. A frame 6 of the true triaxial testing machine is provided with a mounting hole 7 for the unloading device. The first electromagnet mounting base 3 adopts a cylindrical structure, a cylinder wall is formed at a cylinder opening at one side of the first electromagnet mounting base 3, and no cylinder wall is formed at another side of the first electromagnet mounting base 3. The first electromagnet mounting base 3 is fixedly mounted in the mounting hole 7 for the unloading device through bolts, and the cylinder opening disposed at the one side with the cylinder wall of the first electromagnet mounting base 3 faces a center of the frame, and the cylinder opening disposed at the other side without the cylinder wall of the first electromagnet mounting base 3 faces an outside of the frame. The first electromagnet 1 adopts an annular structure, and fixedly mounted on the first electromagnet mounting base 3 through bolts. The first electromagnet 1 and the first electromagnet mounting base 3 are coaxially arranged. The restraining disc 5 adopts an annular structure, and is located on an outer side of the cylinder opening at the other side without the cylinder wall of the first electromagnet mounting base 3. The restraining disc 5 is fixedly mounted on the frame 6 through bolts, and the restraining disc 5 and the first electromagnet mounting base 3 are coaxially arranged. The second electromagnet mounting base 4 adopts an annular structure, and is located between the restraining disc 5 and the first electromagnet 1. The second electromagnet mounting base 4 has an axial movement degree of freedom between the restraining disc 5 and the first electromagnet 1. A maximum distance between the second electromagnet mounting base 4 and the first electromagnet 1 is set as an unloading clearance, and the unloading clearance is greater than or equal to 20 mm. The second electromagnet mounting base 4 and the first electromagnet 1 are coaxially arranged. The second electromagnet 2 adopts an annular structure. The second electromagnet 2 is fixedly mounted on the second electromagnet mounting base 4 through bolts, the second electromagnet 2 is directly opposite to the first electromagnet 1, and the second electromagnet 2 and the second electromagnet mounting base 4 are coaxially arranged. The second electromagnet mounting base 4 fixedly sleeves on a cylinder of an actuator 8 of the true triaxial testing machine. A piston rod through hole 9 is arranged at a center of the cylinder wall of a cylinder opening of the first electromagnet mounting base 3, and a piston rod of the actuator 8 penetrates through the piston rod through hole 9 to be fixedly connected with a load measuring piece 10 of the true triaxial testing machine. The first electromagnet mounting base 3 and the second electromagnet mounting base 4 are both made of a magnetic isolation material.

An antifriction material layer 11 is further provided on an inner surface of a lateral cylinder wall of the first electromagnet mounting base 3, and the second electromagnet mounting base 4 is in sliding contact with the antifriction material layer 11.

A coil of the first electromagnet 1 and a coil of the second electromagnet 2 are connected with a power supply 13 through an unloading controller 12. The magnitudes and directions of currents in the coil of the first electromagnet 1 and in the coil of the second electromagnet 2 are regulated through the unloading controller 12, thereby regulating the magnitudes and directions of electromagnetic forces of the first electromagnet 1 and the second electromagnet 2.

A buffer layer is further provided on an inner surface of the restraining disc 5 and adopts a spring pad or a rubber pad, and the buffer layer eliminates kinetic energy of the second electromagnet 2, the second electromagnet mounting base 4 and the actuator 8 of the true triaxial testing machine during unloading, so as to reduce an impact force on the frame 6 of the true triaxial testing machine.

The following describes a single operation process of the invention with reference to the drawings:

Before loading a sample, an electromagnetic attraction of not less than 100 kN is generated between the first electromagnet 1 and the second electromagnet 2 through an unloading controller 12, so that the first electromagnet 1 and the second electromagnet 2 can be tightly attracted together. At this time, the actuator 8 is firmly connected with the frame 6 by means of the electromagnetic attraction.

In the sample loading stage, ensure that the electromagnetic attraction between the first electromagnet 1 and the second electromagnet 2 remain unchanged, start the actuator 8 at the same time, load the sample through the piston rod of the actuator 8, and complete the corresponding loading test as required.

When the rapid unloading test is required, the electromagnetic attraction between the first electromagnet 1 and the second electromagnet 2 is rapidly changed to the electromagnetic repulsion force of no less than 50 kN through the unloading controller 12. Under the action of the electromagnetic repulsion force, the second electromagnet 2, the second electromagnet mounting base 4 and the actuator 8 are quickly released, and load force exerted on the sample by the piston rod of the actuator 8 is also removed instantaneously, and then the piston rod is controlled to retract.

In the process of rapid unloading, the time taken for the second electromagnet 2 from the pull-in state to the releasing state to the maximum unloading clearance shall not be greater than 0.2 s.

After rapid unloading is completed, if it is necessary to continue to retract the piston rod of the actuator 8, the electromagnetic repulsion force between the first electromagnet 1 and the second electromagnet 2 can be kept unchanged, and the piston rod of the actuator 8 can be retracted at the same time.

The scheme in the embodiment is not intended to limit the scope of claims of the invention, and any equivalent implementation or change not deviating from the invention is included in the scope of claims of the present application.

What is claimed is:

1. A one-way rapid electromagnetic unloading device suitable for a true triaxial testing machine, comprising a first electromagnet, a second electromagnet, a first electromagnet mounting base, a second electromagnet mounting base and a restraining disc, wherein a frame of the true triaxial testing machine is provided with a mounting hole for the unloading device, wherein the first electromagnet mounting base adopts a cylindrical structure, a cylinder wall is formed at a cylinder opening at one side of the first electromagnet mounting base, no cylinder wall is formed at other side of the first electromagnet mounting base, the first electromagnet mounting base is fixedly mounted in the mounting hole for the unloading device through bolts, and the cylinder opening disposed at the one side with the cylinder wall of the first electromagnet mounting base faces a center of the frame, and the cylinder opening disposed at the other side without the cylinder wall of the first electromagnet mounting base faces an outside of the frame, wherein the first electromagnet adopts an annular structure, and fixedly mounted on the first electromagnet mounting base through bolts, and the first electromagnet and the first electromagnet mounting base are coaxially arranged, wherein the restraining disc adopts an annular structure and is located at an outer side of the cylinder opening at the other side without the cylinder wall of the first electromagnet mounting base, the restraining disc is fixedly mounted on the frame through bolts, and the restraining disc and the first electromagnet mounting base are coaxially arranged, wherein the second electromagnet mounting base adopts an annular structure and is located between the restraining disc and the first electromagnet, the second electromagnet mounting base has an axial movement degree of freedom between the restraining disc and the first electromagnet, and a maximum distance between the second electromagnet mounting base and the first electromagnet is set as an unloading clearance, wherein the second electromagnet mounting base and the first electromagnet are coaxially arranged, wherein the second electromagnet adopts an annular structure, the second electromagnet is fixedly mounted on the second electromagnet mounting base through bolts, the second electromagnet is directly opposite to the first electromagnet, and the second electromagnet and the second electromagnet mounting base are coaxially arranged, wherein the second electromagnet mounting base fixedly sleeves on a cylinder of an actuator of the true triaxial testing machine, a piston rod through hole is arranged at a center of the cylinder wall of the cylinder opening of the first electromagnet mounting base, and a piston rod of the actuator penetrates through the piston rod through hole to be fixedly connected with a load measuring piece of the true triaxial testing machine, and wherein the first electromagnet mounting base and the second electromagnet mounting base are both made of a magnetic isolation material.

2. The one-way rapid electromagnetic unloading device according to claim 1, wherein an antifriction material layer is further provided on an inner surface of a lateral cylinder wall of the first electromagnet mounting base, and the second electromagnet mounting base is in sliding contact with the antifriction material layer.

3. The one-way rapid electromagnetic unloading device according to claim 1, wherein a coil of the first electromagnet and a coil of the second electromagnet are connected with a power supply through an unloading controller, and magnitudes and directions of currents in the coil of the first electromagnet and in the coil of the second electromagnet are regulated through the unloading controller, thereby regulating the magnitudes and directions of electromagnetic forces of the first electromagnet and the second electromagnet.

4. The one-way rapid electromagnetic unloading device according to claim 1, wherein a buffer layer is further provided on an inner surface of the restraining disc and adopts a spring pad or a rubber pad, and the buffer layer eliminates a kinetic energy of the second electromagnet, the second electromagnet mounting base and the actuator of the true triaxial testing machine during unloading, so as to reduce an impact force on the frame of the true triaxial testing machine.

* * * * *